US009452793B1

(12) United States Patent
Quick (10) Patent No.: US 9,452,793 B1
(45) Date of Patent: Sep. 27, 2016

(54) TRUCK BED EXTENSION APPARATUS (71) Applicant: Larry A. Quick, Anaheim, CA (US)

(72) Inventor: Larry A. Quick, Anaheim, CA (US)

( * ) Notice: Subject to any disclaimer, the term of this patent is extended or adjusted under 35 U.S.C. 154(b) by 0 days.

(21) Appl. No.: 14/956,692

(22) Filed: Dec. 2, 2015

Related U.S. Application Data (60) Provisional application No. 62/246,740, filed on Oct. 27, 2015.

(51) Int. Cl.
*B62D 33/03* (2006.01)
*B62D 33/027* (2006.01)

(52) U.S. Cl.
CPC ........... *B62D 33/0273* (2013.01); *B62D 33/03* (2013.01)

(58) Field of Classification Search
CPC .......................... B62D 33/0273; B62D 33/03
USPC .................................. 296/26.11, 26.15, 57.1
See application file for complete search history.

(56) References Cited

U.S. PATENT DOCUMENTS

| | | | | |
|---|---|---|---|---|
| 4,472,639 A * | 9/1984 | Bianchi | .............. | B62D 33/0273 296/26.11 |
| 4,531,773 A * | 7/1985 | Smith | ................ | B62D 33/0273 224/403 |
| 5,468,038 A | 11/1995 | Sauri | | |
| 5,765,892 A | 6/1998 | Covington | | |
| 5,775,759 A * | 7/1998 | Cummins | .......... | B62D 33/0273 296/26.11 |
| 5,788,311 A | 8/1998 | Tibbals | | |
| 6,158,797 A | 12/2000 | Bauer | | |
| 6,193,294 B1 * | 2/2001 | Disner | ............... | B62D 33/0273 108/44 |
| 6,279,980 B1 * | 8/2001 | Straschewski | ..... | B62D 33/0273 296/26.11 |
| 6,364,392 B1 | 4/2002 | Meinke | | |
| 6,378,926 B1 * | 4/2002 | Renze | ...................... | B60P 3/40 296/183.1 |
| 6,422,342 B1 | 7/2002 | Armstrong et al. | | |
| 6,454,338 B1 | 9/2002 | Glickman et al. | | |
| 6,550,841 B1 | 4/2003 | Burdon et al. | | |
| 6,626,478 B1 | 9/2003 | Minton | | |
| D485,800 S | 1/2004 | Smith | | |

(Continued)

FOREIGN PATENT DOCUMENTS

| | | | |
|---|---|---|---|
| CA | 001244858 A | * | 11/1988 |
| CA | 2 924 242 AA | | 10/2015 |

(Continued)

OTHER PUBLICATIONS

"Fold Down Truck Bed Extender-Anodized Silver Topline Bed Extender BX4004-01", www.etrailer.com, Retrieved Jun. 14, 2016.

*Primary Examiner* — Jason S Morrow
(74) *Attorney, Agent, or Firm* — Knobbe, Martens, Olson & Bear, LLP (57) ABSTRACT

A truck bed extension apparatus is useful in extending the bed of a truck having a primary tailgate pivotally movable between open and closed configurations. The apparatus includes a hinge assembly having a hinge plate coupled to the primary tailgate. An auxiliary tailgate includes a lower edge pivotally coupled to a front edge of the hinge plate, the auxiliary tailgate being pivotally movable between a stowed configuration co-planar with and adjacent to the hinge plate and a deployed configuration extending upwardly from the hinge plate. A pair of side panels is pivotally coupled to opposed side edges of the auxiliary tailgate and selectively movable between retracted and extended configurations. The truck bed is extended and enclosed when the primary tailgate is at an open configuration, the auxiliary tailgate is at the deployed configuration, and the pair of side panels is at the extended configuration.

18 Claims, 14 Drawing Sheets

(56) References Cited

U.S. PATENT DOCUMENTS

| | | |
|---|---|---|
| 6,957,840 B1 | 10/2005 | Endres |
| 7,261,357 B1 | 8/2007 | Bechen |
| 7,264,292 B1 | 9/2007 | Summers |
| 8,109,552 B2 | 2/2012 | Nelson |
| 8,182,012 B1 | 5/2012 | Brister |
| 2006/0033352 A1 | 2/2006 | King et al. |
| 2006/0214449 A1 | 9/2006 | Klusmeier |
| 2008/0231067 A1 | 9/2008 | Nagle |
| 2009/0309381 A1* | 12/2009 | Nelson ............... B62D 33/0273 296/26.11 |
| 2013/0049395 A1* | 2/2013 | Poirier ................... B60R 5/041 296/37.6 |
| 2014/0333083 A1 | 11/2014 | Bzoza |

FOREIGN PATENT DOCUMENTS

| | | |
|---|---|---|
| GB | 2 199 365 A1 | 7/1988 |
| GB | 2467319 A1 | 8/2010 |

* cited by examiner

TRUCK BED EXTENSION APPARATUS

REFERENCE TO RELATED APPLICATIONS

This application claims the benefit of provisional patent application U.S. Ser. No. 62/246,740 filed Oct. 27, 2015 titled Quick Extend-A-Bed and which is incorporated herein by reference.

BACKGROUND OF THE INVENTION

This invention relates generally to truck tailgate accessories and, more particularly, to a truck bed extension apparatus for selectively increasing the length of a truck bed and enclosing the lengthened truck bed area.

Therefore, it would be desirable to have a truck bed extension apparatus that lengthens and encloses the lengthened truck bed. Further, it would be desirable to have a truck bed extension apparatus that is pivotally movable between a stowed configuration substantially co-planar with an inner surface of the truck's tailgate to a deployed configuration extending upwardly from an opened truck tailgate and to a released configuration extending downwardly from the opened truck tailgate.

SUMMARY OF THE INVENTION

A truck bed extension apparatus according to the present invention for use in extending a usable area of a truck having a pickup box and truck bed that defines an open end and that includes a primary tailgate pivotally movable between a closed configuration covering the open end and an open configuration not covering the open end, the extension apparatus having a hinge assembly that includes a hinge plate coupled to the primary tailgate, the hinge plate having a front edge adjacent a free edge of the primary tailgate. An auxiliary tailgate includes a lower edge pivotally coupled to the front edge of the hinge plate, the auxiliary tailgate being pivotally movable between a stowed configuration generally co-planar with and adjacent to the hinge plate and a deployed configuration extending upwardly from and perpendicular to the hinge plate.

A pair of side panels are pivotally coupled to side edges of the auxiliary tailgate, respectively, each side panel being selectively movable between a retracted configuration generally co-planar with and bearing against an inside surface of the auxiliary tailgate and an extended configuration generally perpendicular to the inside surface of the auxiliary tailgate. The truck bed is extended and enclosed when the primary tailgate is at the open configuration, the auxiliary tailgate is at the deployed configuration, and the pair of side panels is at the extended configuration.

Therefore, a general object of this invention is to provide a truck bed extension apparatus for selectively increasing the length of a pickup truck bed.

Another object of this invention is to provide a truck bed extension apparatus, as aforesaid, having an auxiliary tailgate that may be stowed away on an inner surface of the truck's primary tailgate or deployed upwardly when the primary tailgate is opened.

Still another object of this invention is to provide a truck bed extension apparatus, as aforesaid, in which the lengthened truck bed may be enclosed by the auxiliary tailgate and foldout side panels.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A truck bed extension apparatus according to a preferred embodiment of the present invention will now be described in detail with reference to FIGS. 1 to 14 of the accompanying drawings. The truck bed extension apparatus 10 includes an auxiliary tailgate 40, a pair of side panels 46, and a hinge assembly 20 for use with a truck bed 2, also referred to as a pickup box, having a primary tailgate 3.

The primary tailgate 3 of a pickup truck is pivotally movable between a closed configuration (FIG. 5) that blocks access to the interior of the pickup box 2 via its open rear end and an open configuration (FIGS. 2 to 4) that allows access to the interior, a.k.a. truck bed, via its open rear end. The primary tailgate 3 has a free edge 4 and may include a handle 5 configured to release the primary tailgate 3 to move between closed and open configurations. A conventional pickup box 2 may include fasteners adjacent the open rear end that are useful in fastening a portion of the present invention to the pickup box 2 as will be described later.

Figures 7A, 7B, 7C:
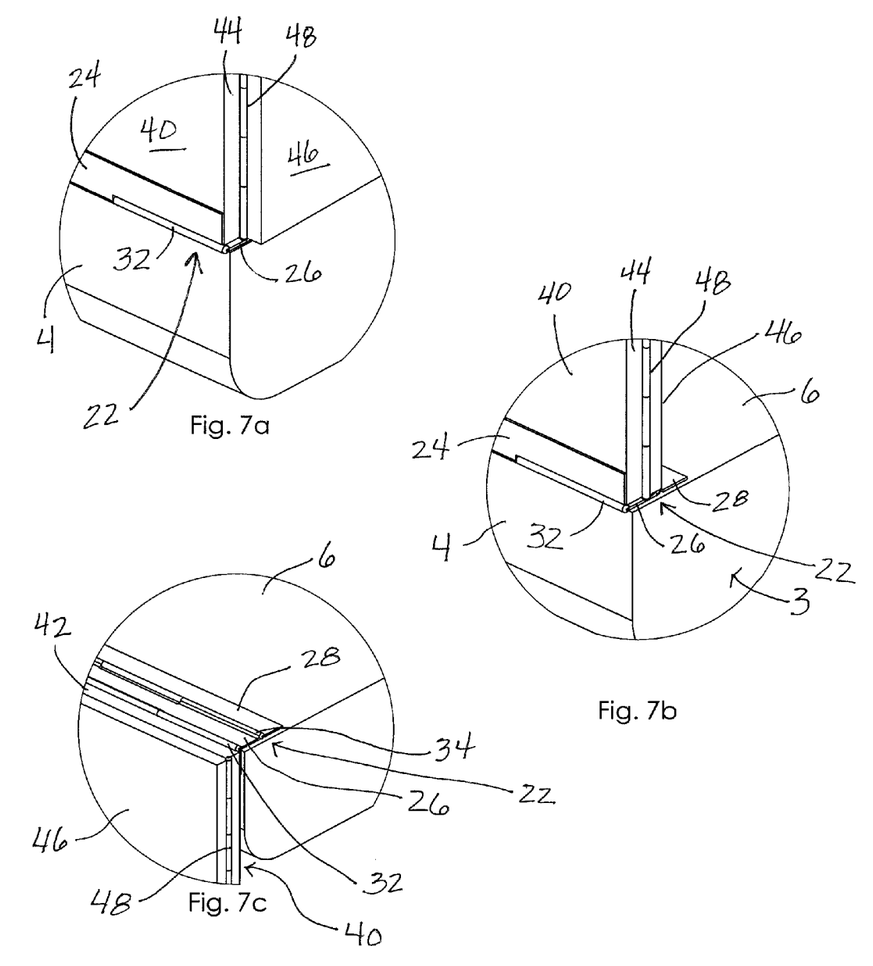
FIG. 7a is an isolated view on an enlarged scale taken from FIG. 1.
FIG. 7b is an isolated view on an enlarged scale taken from FIG. 2.
FIG. 7c is an isolated view on an enlarged scale taken from FIG. 3.

The hinge assembly 20 of the truck bed extension apparatus 10 is coupled to the primary tailgate 3 of a truck and provides the means for mounting the additional components of the invention to the primary tailgate 3. More particularly, the hinge assembly 20 includes a hinge plate 22 having a front portion 24 that is, at deployed and released configuration, situated adjacent the free edge 4 of the primary tailgate 3 of a pickup truck. In fact, the front portion 24 may be coupled to the auxiliary tailgate 40, such as with bolts (not shown). Preferably, the hinge assembly 20 includes a double hinge member 30 having a first hinge 32 and a second hinge 34 rearwardly displaced from and parallel to the first hinge 32 (FIG. 7*c*). The hinge plate 22 includes a first plate section 26 extending between the first hinge 32 and the second hinge 34 and a second plate section 28 extending rearwardly (away from) the second hinge 34 (FIG. 7*b*). The second plate section 28 may be fixedly attached to the inner surface 6 of the primary tailgate 3, such as with bolts (not shown), while the first plate section 26 movable relative to the inner surface 6 of the primary tailgate 3 as will be described in more detail below.

Figure 2:
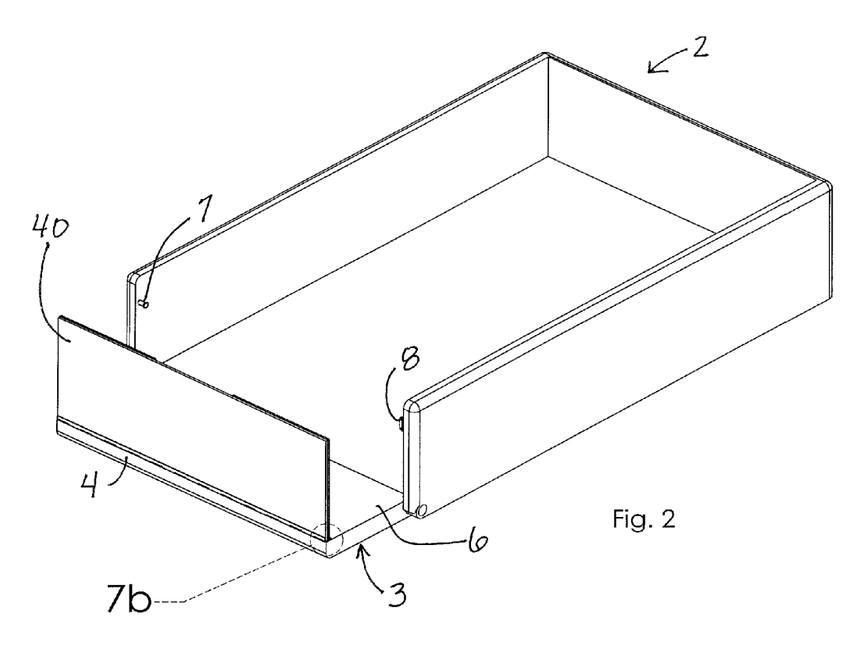
FIG. 2 is another perspective view of the extension apparatus as in FIG. 1, illustrating the apparatus in an extended but not enclosed configuration.

The auxiliary tailgate 40 may have a generally rectangular configuration having a lower edge 42 and opposed side edges 44. The auxiliary tailgate 40 may have dimensions that are substantially similar to the dimensions of the primary tailgate 3. The lower edge 42 of the auxiliary tailgate 40 may be operably coupled to the hinge assembly 20 and pivotally movable between a stowed configuration that is generally co-planar with and adjacent to the inner surface 6 of the primary tailgate 3 (FIG. 4) and a deployed configuration generally perpendicular to and extending upwardly from the inner surface 6 of the primary tailgate 3 (FIG. 2). Clearly, when the primary tailgate 3 is at its open configuration and the auxiliary tailgate 40 is at the deployed configuration, access to the interior of the pickup box 2 is blocked.

Figure 3:
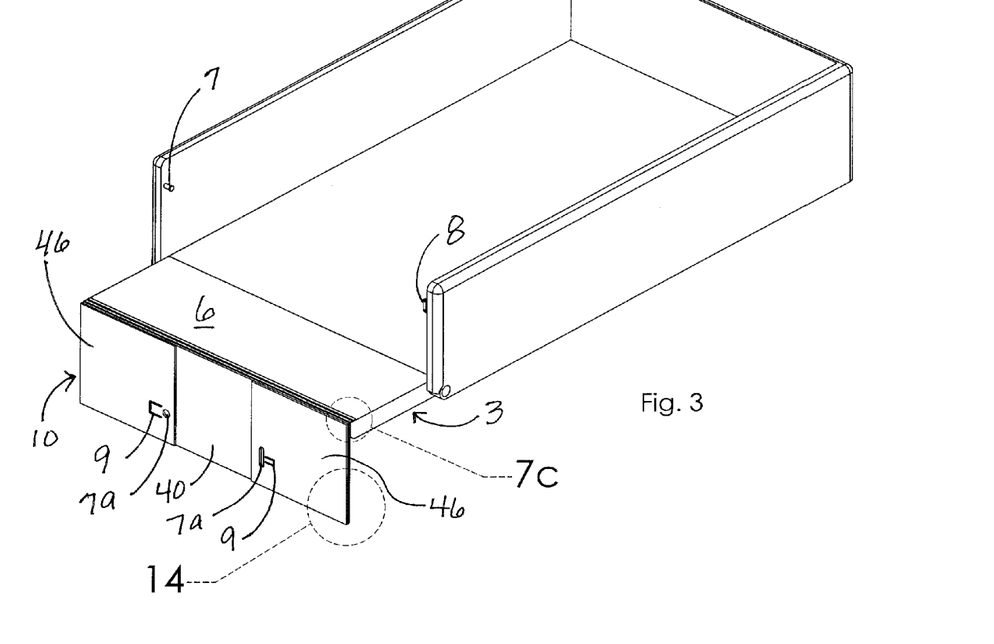
FIG. 3 is another perspective view of the extension apparatus as in FIG. 1, illustrating the auxiliary tailgate in a released configuration.
Figure 4:
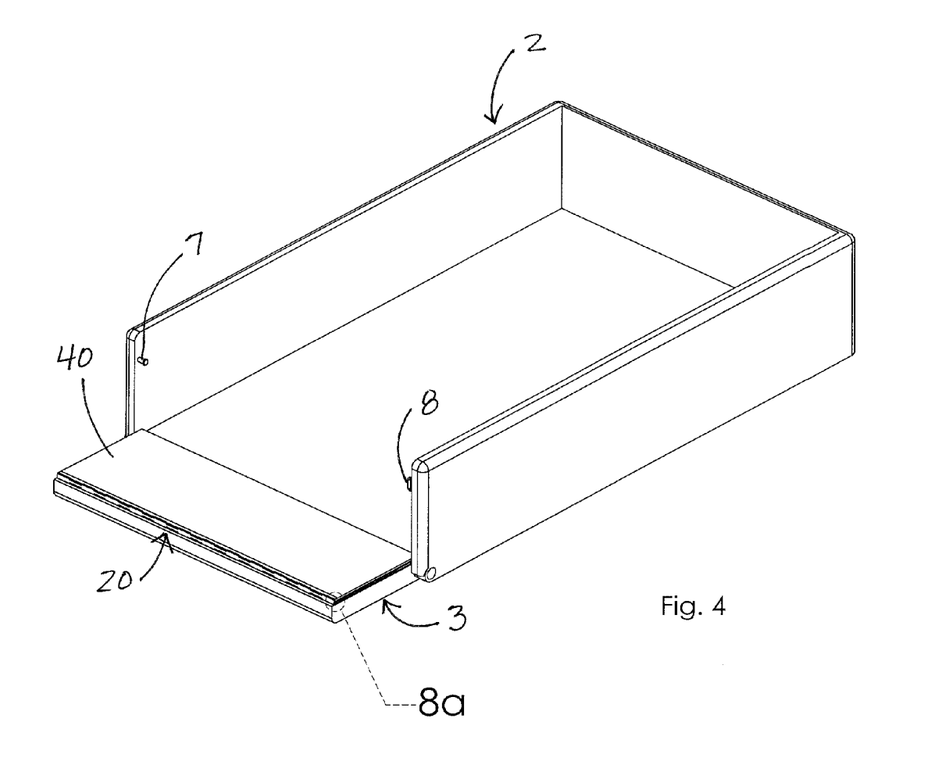
FIG. 4 is another perspective view of the extension apparatus as in FIG. 1, illustrating the auxiliary tailgate in a stowed configuration.
Figure 5:
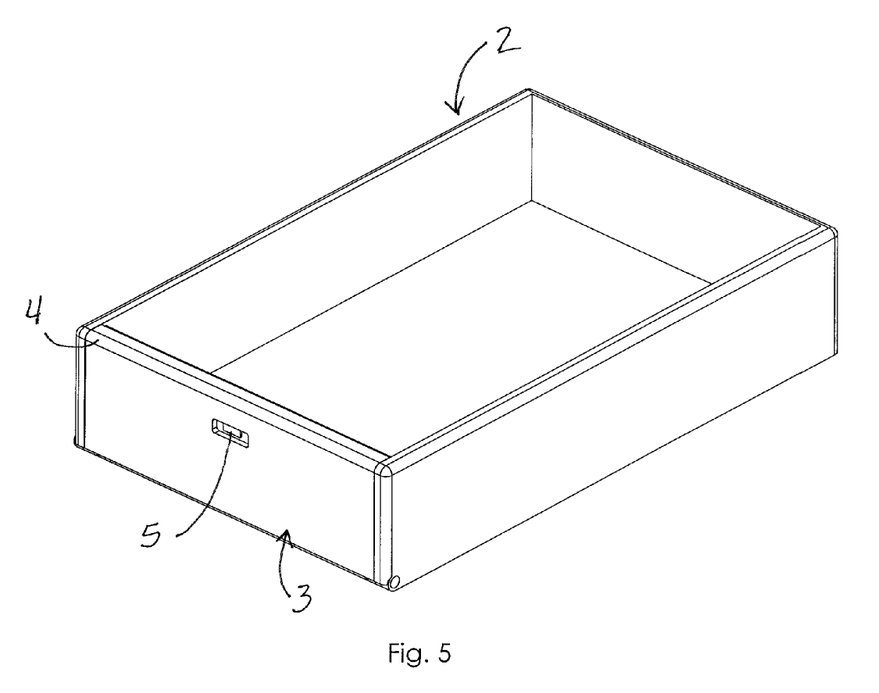
FIG. 5 is another perspective view of the extension apparatus as in FIG. 1, illustrating the primary tailgate in a closed configuration.
Figure 6:
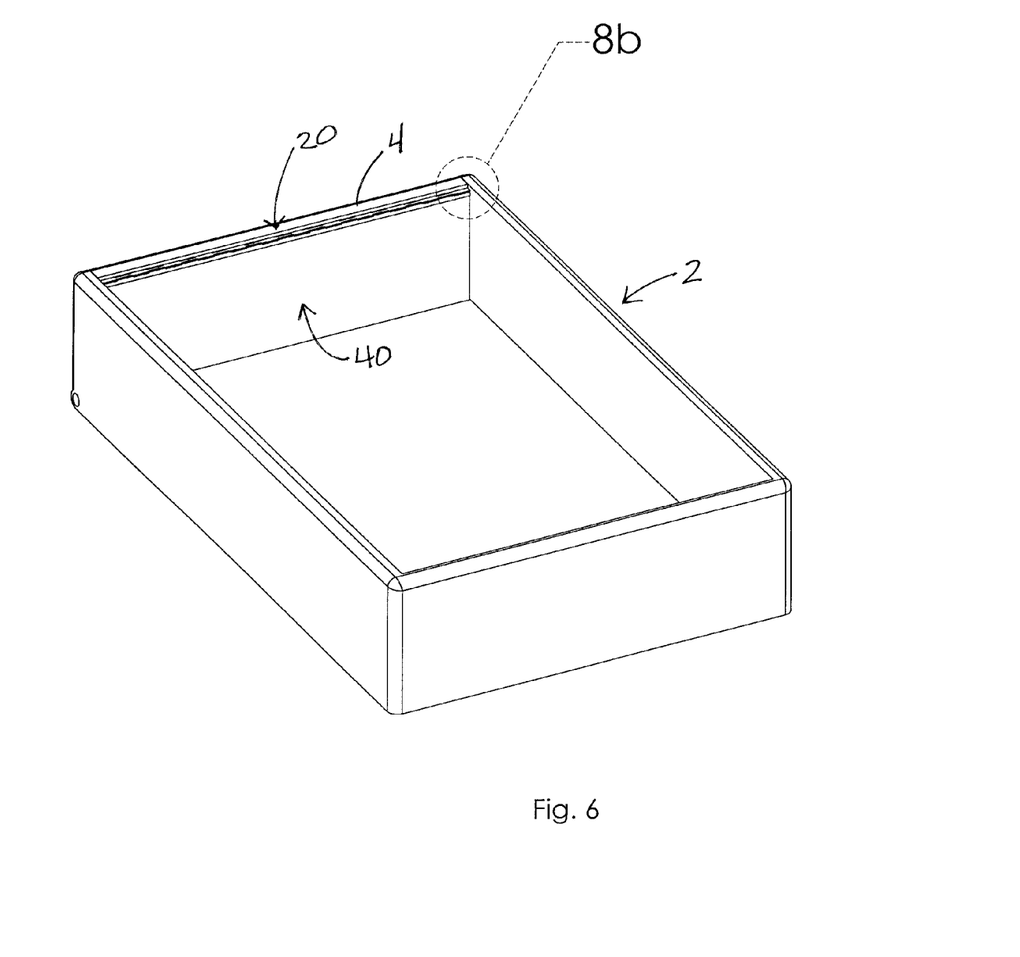
FIG. 6 is a perspective view from reverse angle of the extension apparatus as in FIG. 5.

The auxiliary tailgate 40 is pivotally movable by operation of the hinge assembly 20. More particularly, the auxiliary tailgate 40 is pivotally movable to a released configuration generally perpendicular to and extending downwardly from the front portion 24 of the hinge plate 22 and free edge 4 of the primary tailgate 3 (FIG. 3). When the primary tailgate 3 is at its open configuration and the auxiliary tailgate 40 is at the released configuration, access to the interior of the pickup box 2 is not blocked. Movement of the auxiliary tailgate 40 between the deployed configuration and released configuration is by operation (pivotal rotation) of the first hinge 32.

It will be understood that the double hinge assembly 20 enables about 270 degrees of rotation upon operation of the first hinge 32 and second hinge 34, respectively. Specifically, the auxiliary tailgate 40 is rotated about 90 degrees from the stowed configuration (FIG. 4) to the deployed configuration (FIG. 2). Similarly, the auxiliary tailgate 40 is rotated about 180 degrees from the deployed configuration (FIG. 2) to the released configuration (FIG. 3).

In an embodiment, selective operation of the first hinge 32, second hinge 34, and hinge plate 22 are required to move the auxiliary tailgate 40 from the stowed configuration to the deployed configuration to the released configuration and back again. As shown in FIG. 7*b* (illustrating the deployed configuration) and FIG. 7*c* (illustrating the released configuration), the hinge plate 22 of the double hinge member 30 lies flat atop the inner surface 6 of the primary tailgate 3. In addition, a front portion 24 of the hinge plate 22 and first hinge 32 are adjacent the free edge 4 of the primary tailgate 3. Movement of the auxiliary tailgate 40 between the deployed and released configurations is by a 180 degree rotational movement of the first hinge 32, the lower edge 42 of the auxiliary tailgate 40 being coupled to the first hinge 32.

Figure 8A:
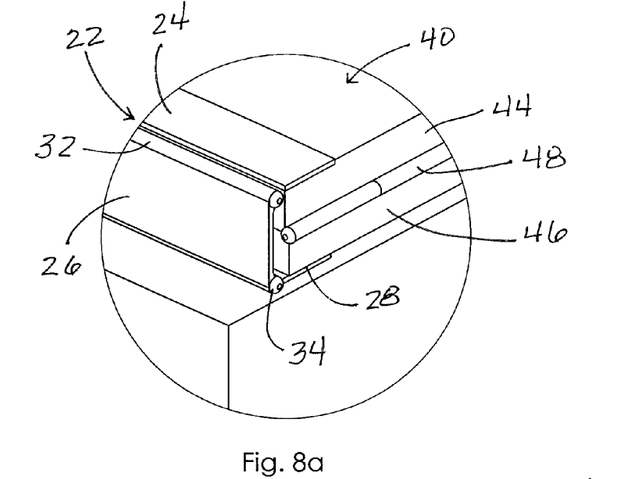
FIG. 8a is an isolated view on an enlarged scale taken from FIG. 4.
Figure 8B:
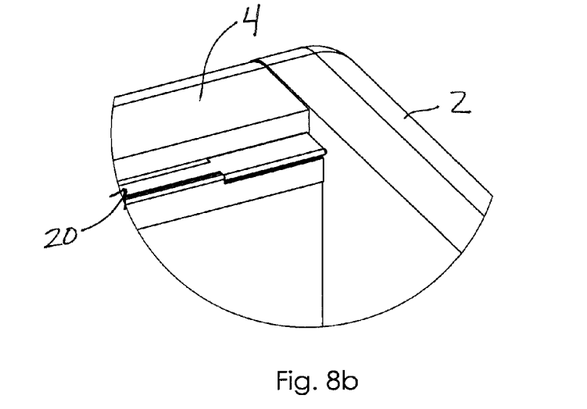
FIG. 8b is an isolated view on an enlarged scale taken from FIG. 6.
Figure 9:
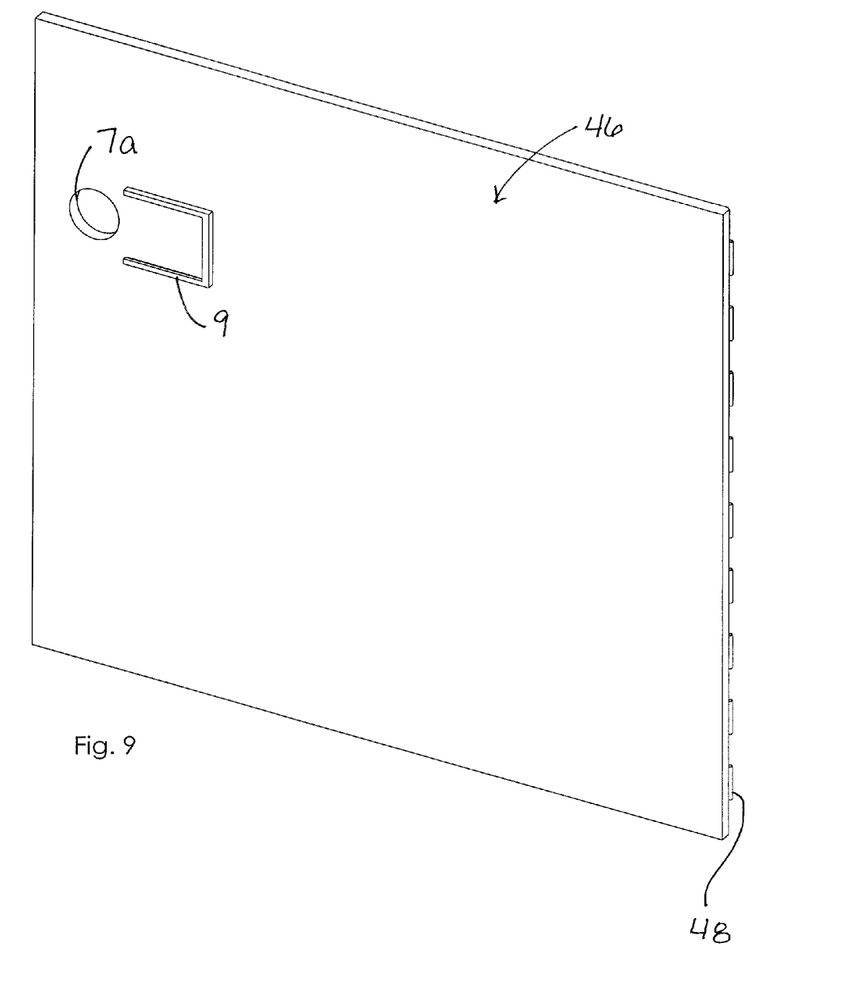
FIG. 9 is an isolated perspective view of one side panel taken from FIG. 1.
Figure 10:
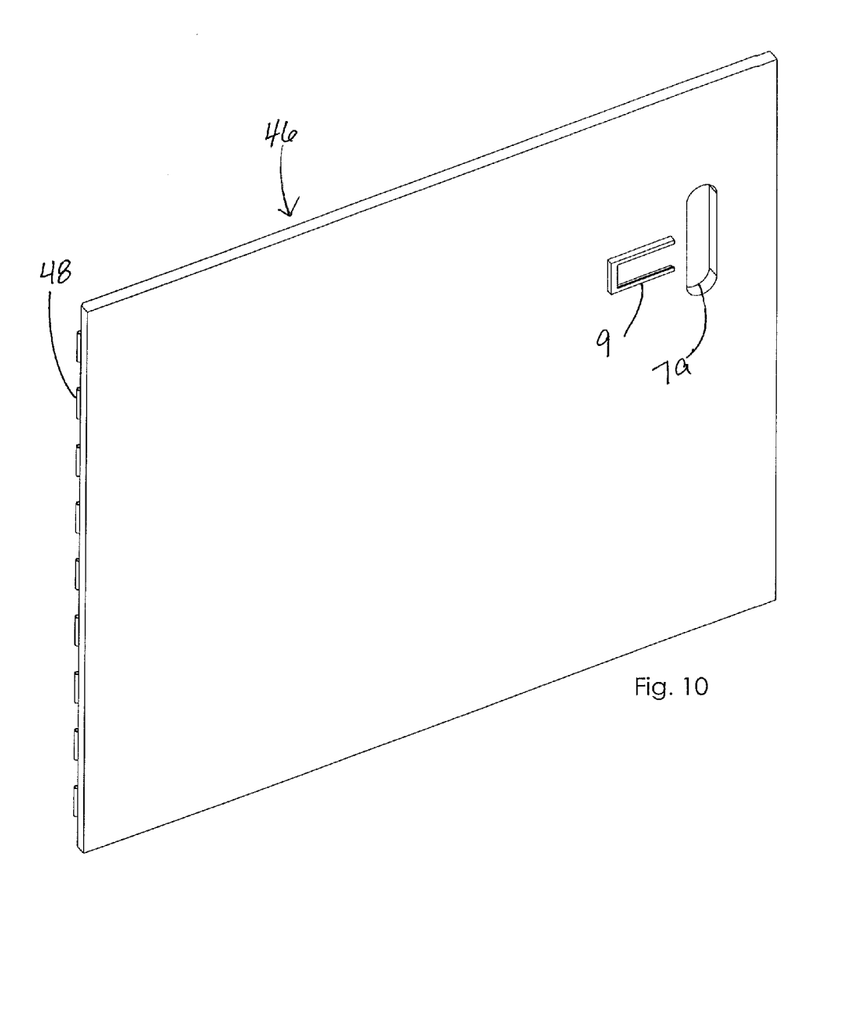
FIG. 10 is an isolated perspective view of another side panel taken from FIG. 1.
Figure 11:
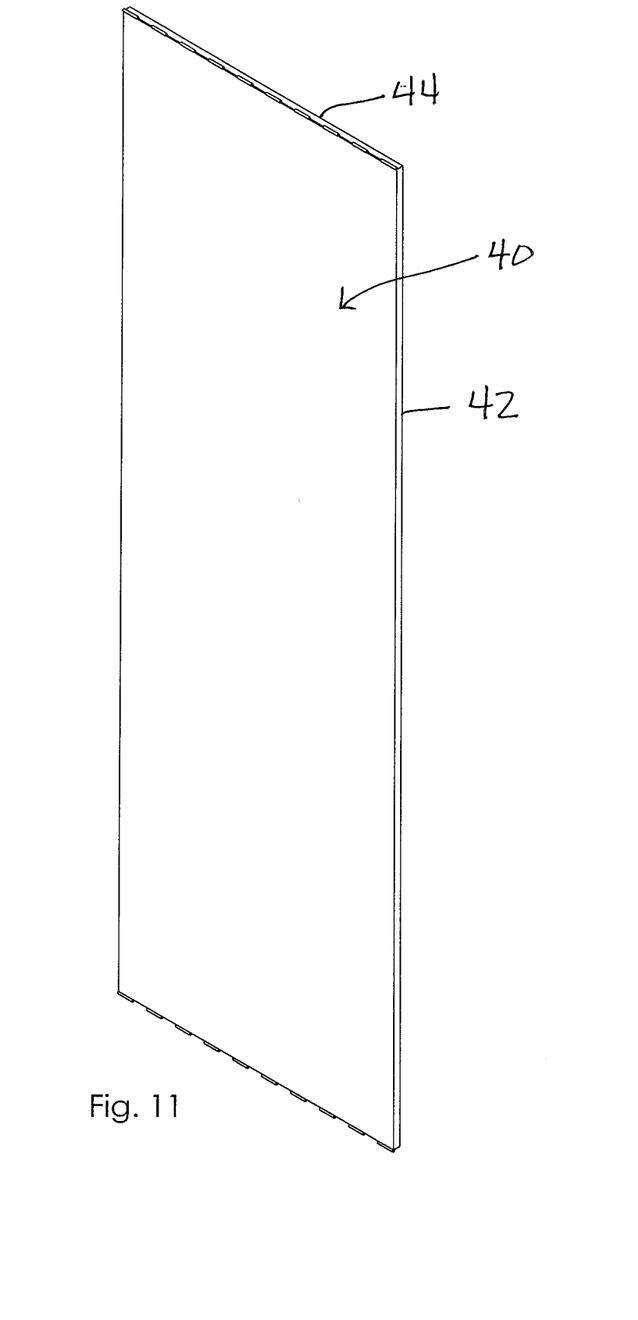
FIG. 11 is an isolated perspective view of the auxiliary tailgate taken from FIG. 1.
Figure 12A:
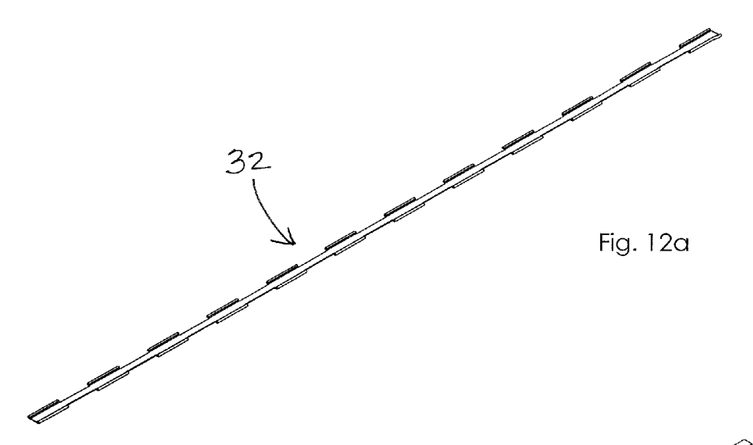
FIG. 12a is an isolated view of a first hinge.
Figure 12B:
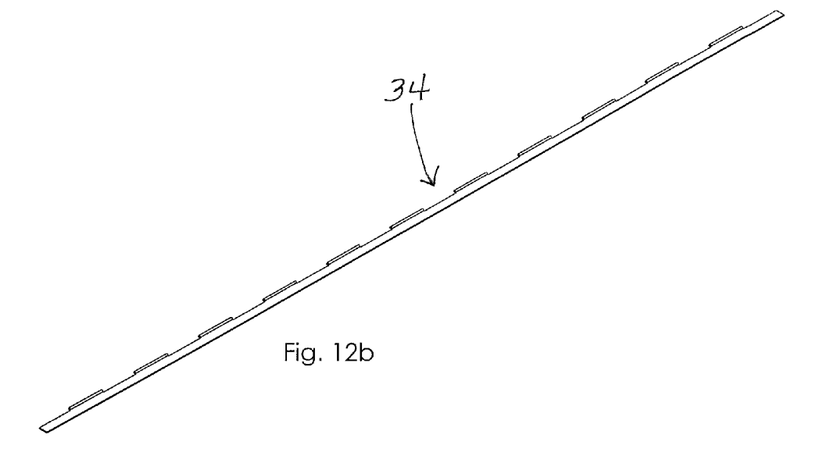
FIG. 12b is an isolated view of a second hinge.

Movement of the auxiliary tailgate 40 to the stowed configuration (FIG. 4), however, involves rotation of the second hinge 34. More particularly, the first hinge plate 22 is displaced from the inner surface 6 of the primary tailgate 3 and is rotated by the second hinge 34 until it becomes situated substantially vertical and perpendicular relative to the second plate section 28 (FIG. 8*a*). At this configuration (stowed), the first hinge 32 and second hinge 34, while still displaced, are situated in a common vertical plane (FIG. 8*a*). As a result, the auxiliary tailgate 40 is essentially positioned atop or adjacent the inner surface 6 of the primary tailgate 3. At the stowed configuration, the primary tailgate 3 may be pivotally moved to the closed configuration in a conventional manner without any interference by the auxiliary tailgate 40 (FIG. 8*b*).

Figure 1:
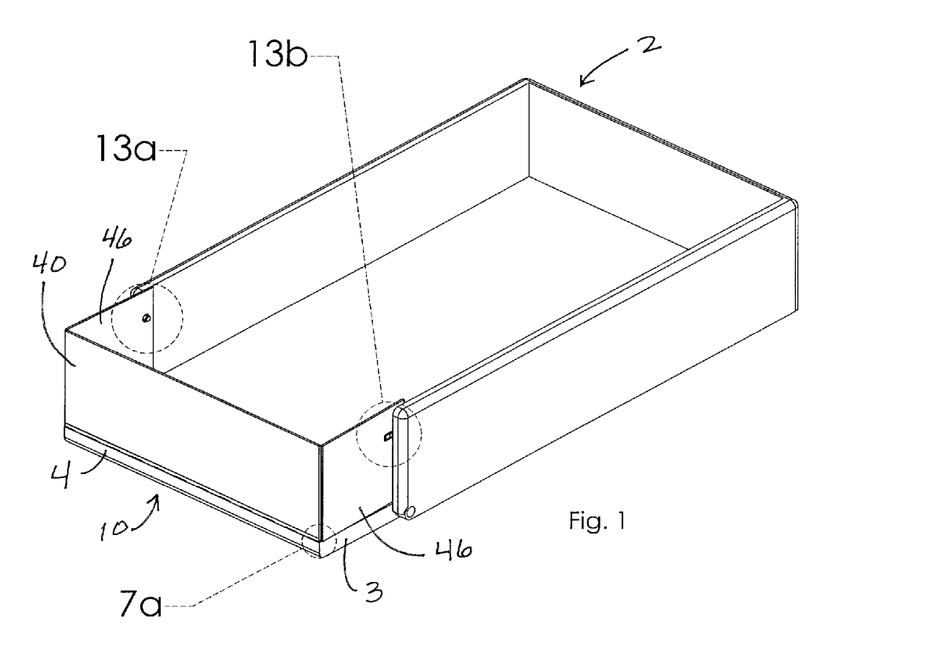
FIG. 1 is a perspective view of a truck bed extension apparatus according to a preferred embodiment of the present invention illustrating the apparatus in an extended and enclosed configuration.

In another aspect, the truck bed extension apparatus 10 includes a pair of side panels 46 pivotally coupled to opposed side edges 44 of the auxiliary tailgate 40, respectively. Each side panel 46 may be pivotally attached with hinges 48 and is selectively movable between a between a retracted configuration that is generally co-planar with or bearing against an inside surface of the auxiliary tailgate 40 (FIG. 3) and an extended configuration generally perpendicular to the inside surface of the auxiliary tailgate 40 (FIG. 1). In other words, the side panels 46 may be selectively rotated to closed positions, such as when the auxiliary tailgate 40 is being moved to the stowed configuration. However, the side panels 46, when moved to the extended configurations, provide extensions of the pickup box side walls. To be clear, the "extended truck bed" is extended and enclosed when the primary tailgate 3 is at the opened configuration, the auxiliary tailgate 40 is at the deployed configuration, and the pair of side panels 46 is at the extended configuration (FIG. 1).

Figure 13A:
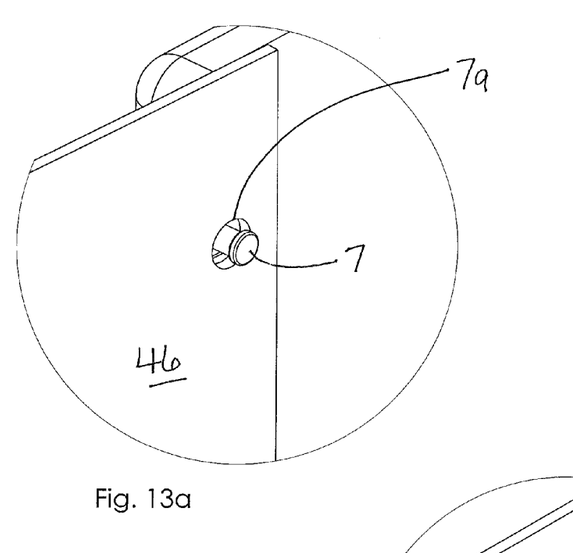
FIG. 13a is an isolated view on an enlarged scale taken from FIG. 1.
Figure 13B:
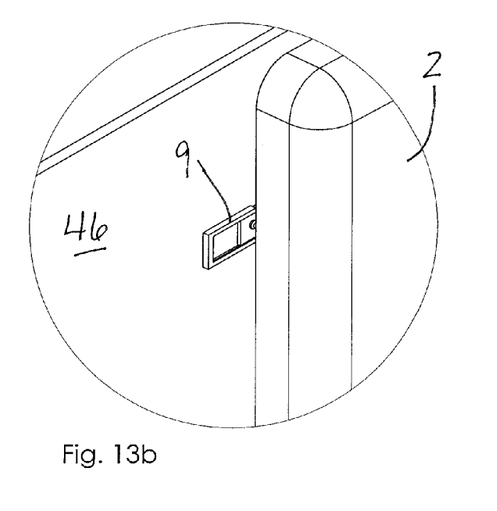
FIG. 13b is an isolated view on an enlarged scale taken from FIG. 1.
Figure 14:
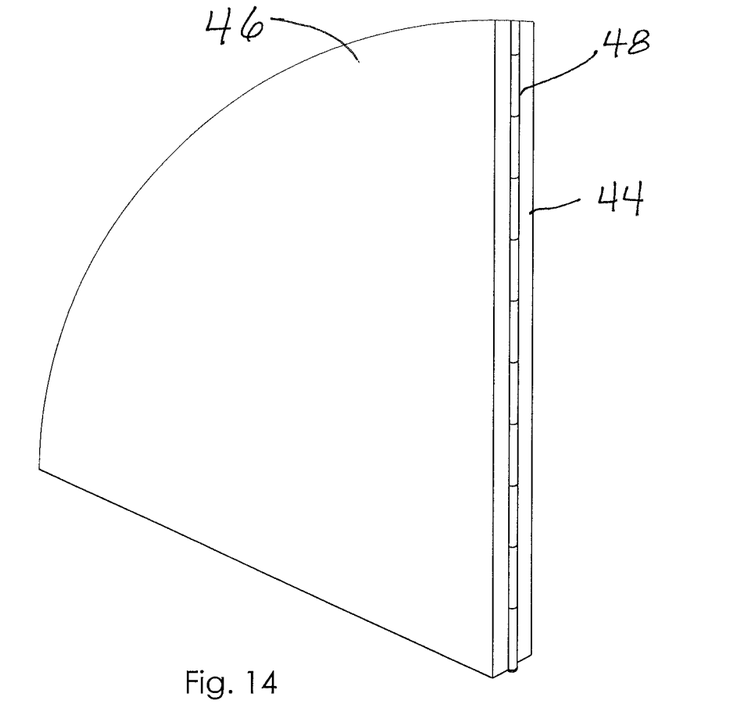
FIG. 14 is an isolated view on an enlarged scale taken from FIG. 3.

Modern pickup trucks include one of two types of fasteners adjacent the rear open end of the truck bed or pickup box. In one instance, a post 7 may extend inwardly from a side panel of the pickup box 2 (FIG. 13*a*). Accordingly, each side panel 46 may define an aperture 7*a* complementary to the post 7 for selective attachment thereto. In another instance, a D-ring fastener 8 may extend inwardly from a respective side panel (FIG. 13*b*). In this construction, each side panel 46 may include a slider 9 configured to selectively engage with the D-ring fastener 8 (FIG. 13*b*). In either configuration, the side panels 46 are releasably but securely coupled to the side panels of the truck bed itself. As such, the aperture 7*a*, D-ring fastener 8 and/or slider 9 can be considered as serving as a means for selectively fastening free ends of said pair of side panels 46 to the pickup box 2 at said extended configurations.

In use, the truck bed extension apparatus 10 may be mounted to the inner surface 6 of a conventional truck primary tailgate 3, such as by bolting or screwing a portion of the hinge plate 22 of the hinge assembly 20 to the tailgate. With the auxiliary tailgate 40 at the stowed configuration, the primary tailgate 3 may be operated in a customary manner. However, if a user desires to extend the truck bed, the primary tailgate 3 is released to the open configuration and the auxiliary tailgate 40 is rotated to the upstanding/deployed configuration (FIG. 2). To enclose the now extended truck bed, the pair of side panels 46 may be pivotally moved to respective extended configurations and locked in as described above (FIG. 1).

It is understood that while certain forms of this invention have been illustrated and described, it is not limited thereto except insofar as such limitations are included in the following claims and allowable functional equivalents thereof.

The invention claimed is:

1. A truck bed extension apparatus for use in extending a usable area of a truck having a pickup box that defines an open end and that includes a primary tailgate pivotally movable about a pivot attaching the primary tailgate to the truck bed, between a closed configuration impeding the open end and an open configuration not impeding the open end, said bed extension apparatus comprising:
a hinge assembly comprising first, second, and third hinge plates and first and second hinges, said first hinge connecting said first and second hinge plates and said second hinge connecting said second and third hinge plates, wherein said first hinge plate is coupled to the primary tailgate, said first hinge plate having a front edge adjacent to and spaced inwardly from a free edge of the primary tailgate, said inward direction extending from the free edge toward the pivot;
an auxiliary tailgate having a lower edge coupled to said third hinge plate, said auxiliary tailgate being pivotally movable between a stowed configuration generally co-planar with and adjacent to the first hinge plate in which an entirety of said hinge assembly is spaced inwardly from said free edge of said primary tailgate, and a deployed configuration extending upwardly from and perpendicular to the first hinge plate in which said second hinge is spaced outwardly from said free edge of said primary tailgate;
a pair of side panels pivotally coupled to side edges of said auxiliary tailgate, respectively, each side panel being selectively movable between a retracted configuration generally co-planar with and bearing against an inside surface of said auxiliary tailgate and an extended configuration generally perpendicular to said inside surface of said auxiliary tailgate;
wherein the pickup box is extended and enclosed when the primary tailgate is at the open configuration, said auxiliary tailgate is at said deployed configuration, and said pair of side panels is at said extended configuration.

2. The truck bed extension apparatus as in claim 1, wherein said auxiliary tailgate is pivotally movable to a released configuration generally perpendicular to the first hinge plate and situated in a direction opposite a direction when at said deployed configuration, wherein the auxiliary tailgate is supported by the second hinge which is disposed spaced outwardly from said free edge of said primary tailgate when at said deployed configuration.

3. The truck bed extension apparatus as in claim 2, wherein:
said auxiliary tailgate is rotated about 90 degrees from said stowed configuration when moved to said deployed configuration;
said auxiliary tailgate is rotated about 180 degrees from said deployed configuration when moved to said released configuration;
said auxiliary tailgate is rotated about 270 degrees from said stowed configuration when moved to said released configuration.

4. The truck bed extension apparatus as in claim 3, wherein said hinge assembly includes a rotational range of at least 270 degrees.

5. The truck bed extension apparatus as in claim 1, wherein said hinge assembly includes a rotational range of at least 270 degrees.

6. The truck bed extension apparatus as in claim 1, wherein
said second hinge plate is positioned adjacent the free edge of the primary tailgate and is perpendicular to said auxiliary tailgate when said auxiliary tailgate is at said deployed configuration; and
said second hinge plate is displaced from the free edge of the primary tailgate and is situated vertically and perpendicular to said first hinge plate at said stowed configuration.

7. The truck bed extension apparatus as in claim 1, wherein said second hinge is positioned forwardly and in a common horizontal plane relative to said first hinge at said deployed configuration and said second hinge is positioned above and in a common vertical plane relative to said first hinge at said stowed configuration.

8. The truck bed extension apparatus as in claim 1, further comprising means for selectively fastening free ends of said pair of side panels to the pickup box at said extended configurations, respectively.

9. A truck bed extension apparatus for extending a truck bed of a truck having a primary tailgate pivotally movable about a pivot attaching the primary tailgate to the truck bed, between a closed configuration preventing access to an open end of the truck bed and an open configuration allowing access to the open end, said truck bed extension apparatus comprising:
a hinge assembly that includes a first hinge plate coupled to the primary tailgate, said first hinge plate having a front edge spaced inwardly from an uppermost free edge of the primary tailgate, the inward direction extending from the uppermost free edge toward the pivot attaching the primary tailgate to the truck bed;
an auxiliary tailgate having a lower edge pivotally coupled to hinge plate assembly, said auxiliary tailgate being pivotally movable between a stowed configuration generally co-planar with and adjacent to the primary tailgate, in which an entirety of said hinge assembly is spaced inwardly from said uppermost free edge of said primary tailgate, and a deployed configuration extending upwardly from and perpendicular to the primary tailgate;
wherein said auxiliary tailgate is pivotally movable to a released configuration generally perpendicular to and extending downwardly from the front edge of the hinge plate and situated in a direction opposite a direction of said deployed configuration and in which said auxiliary tailgate is spaced outwardly from said uppermost free edge of said primary tailgate.

10. The truck bed extension apparatus as in claim 9, further comprising:
a pair of side panels pivotally coupled to opposed side edges of said auxiliary tailgate, respectively, each side panel being selectively movable between a retracted configuration generally co-planar with and bearing against an inside surface of said auxiliary tailgate and an extended configuration generally perpendicular to said inside surface of said auxiliary tailgate;
wherein the truck bed is extended and enclosed when the primary tailgate is at the open configuration, said auxiliary tailgate is at said deployed configuration, and said pair of side panels is at said extended configuration.

11. The truck bed extension apparatus as in claim 9, wherein:
said auxiliary tailgate is rotated about 90 degrees from said stowed configuration when moved to said deployed configuration;
said auxiliary tailgate is rotated about 180 degrees from said deployed configuration when moved to said released configuration;
said auxiliary tailgate is rotated about 270 degrees from said stowed configuration when moved to said released configuration.

12. The truck bed extension apparatus as in claim 11, wherein said hinge assembly includes a rotational range of at least 270 degrees.

13. The truck bed extension apparatus as in claim 9, wherein said hinge assembly includes a rotational range of at least 270 degrees.

14. The truck bed extension apparatus as in claim 9, wherein said hinge assembly includes a double hinge member having a first hinge situated along said lower edge of said auxiliary tailgate, said auxiliary tailgate being pivotally movable between said deployed configuration and said released configuration by pivotal movement of said first hinge.

15. The truck bed extension apparatus as in claim 14, wherein said double hinge member includes a second hinge displaced from said first hinge and pivotally coupled to said first hinge plate, said auxiliary tailgate being pivotally movable between said deployed configuration and said stowed configuration by pivotal movement of said second hinge.

16. The truck bed extension apparatus as in claim 15, wherein:
said hinge assembly includes:
a second hinge plate intermediate said first hinge and said second hinge;
a third hinge plate extending rearwardly from said second hinge;
said second hinge plate is positioned adjacent the free edge of the primary tailgate and is perpendicular to said auxiliary tailgate when said auxiliary tailgate is at said deployed configuration; and
said second hinge plate is displaced from the free edge of the primary tailgate and is situated vertically and perpendicular to said first hinge plate at said stowed configuration.

17. The truck bed extension apparatus as in claim 15, wherein said first hinge is positioned forwardly relative to said second hinge and in a common horizontal plane with said second hinge at said deployed configuration and said first hinge is positioned in a common vertical plane relative to said second hinge at said stowed configuration.

18. The truck bed extension apparatus as in claim 10, further comprising means for selectively fastening free ends of said pair of side panels to the truck bed when said pair of side panels is at said extended configurations, respectively.

\* \* \* \* \*